Patented Oct. 20, 1942

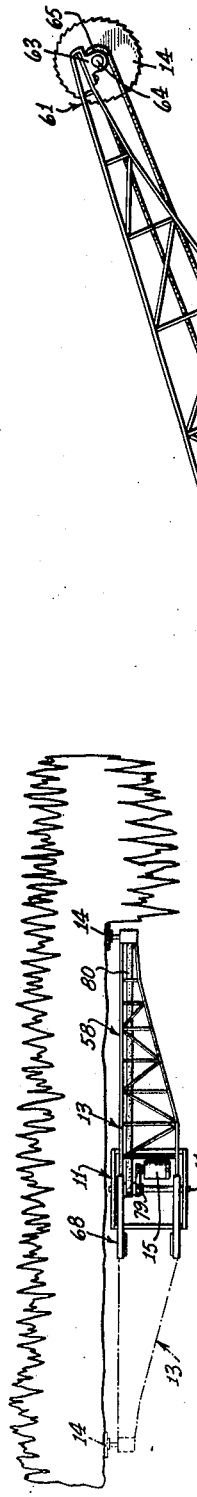

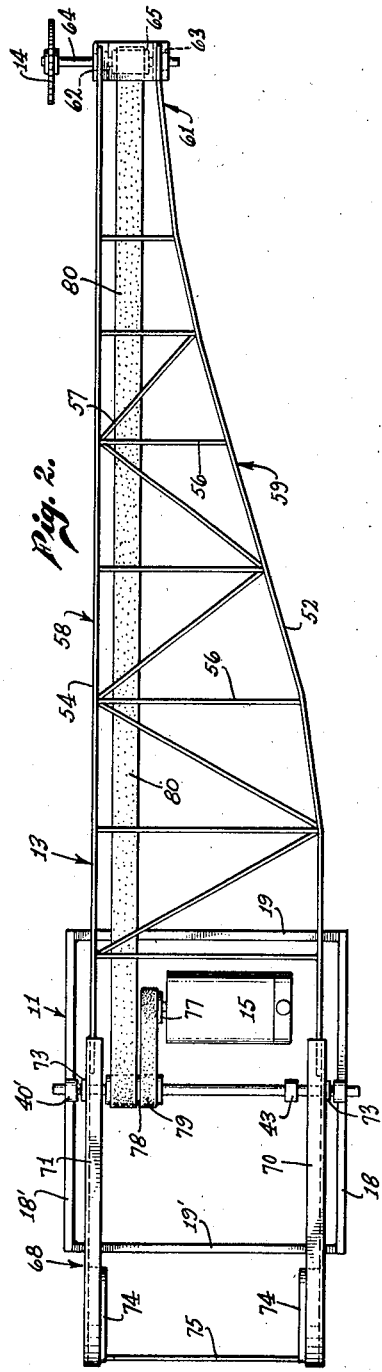
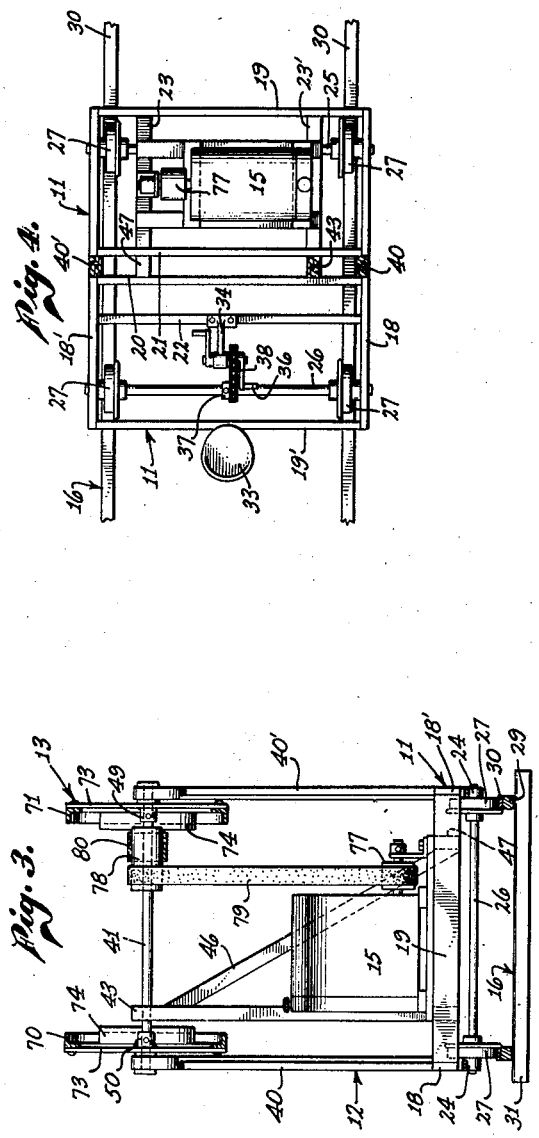

2,299,129

UNITED STATES PATENT OFFICE 2,299,129

POWER TRIM

John M. Dickenson, Jr., and Ralph E. Dickenson, Santa Paula, Calif.

Application July 3, 1939, Serial No. 282,650

4 Claims. (Cl. 143—43)

This invention relates generally to tree pruning or tree trimming machines and is particularly designed for use in trimming rows of trees forming wind-breaks along the margins or orchards and the like.

The tree pruning machines with which we are familiar are cumbersome, bulky and lack mobility and flexibility. In this connection it is the usual practice to mount a motor driven circular saw at the end of a long boom and to provide gear means for moving the boom. Such machines have been found to be impractical for quickly trimming high wind-breaks formed of eucalyptus, cypress or other tall trees. Therefore, it is a primary object of this invention to provide a tree trimming machine which is easy to operate and which is extremely flexible in operation and adaptable to the trimming of various types of trees which are used in the formation of wind-breaks or the like and by means of which the wind-break may be transformed into a vertical and straight wall of foliage.

It is a particular object of this invention to provide a motor driven saw at the end of a boom pivotally mounted so that it can be easily and quickly swung in a vertical plane. In this connection it is also an object of this invention to provide means whereby the swing of the boom may be through an arc of 180° or more as occasion demands. It is a particular object to provide a counter-weighted boom balanced on its pivotal axis.

It is also an object of this invention to provide a boom of sufficient length for trimming high wind-breaks and one which is constructed of relatively light material and yet of sufficient strength to withstand the stresses to which it is subjected. It is also an object of this invention to provide a boom which will not interfere with the vision of the operator of the machine.

It is a further object of this invention to provide a tree trimming machine which is operable on a track and which is provided with means whereby an operator may control both the movement of the boom and a means for moving the carriage back and forth on the track.

These and other objects will be apparent from the drawings and the following description thereof. Referring to the drawings which are for illustrative purposes only;

Fig. 1 is a side elevation of the tree trimming machine of this invention with parts broken away to show portions in section;

Fig. 2 is a top plan view of the machine of this invention showing the boom in horizontal position;

Fig. 3 is a sectional elevation on line 3—3 of Fig. 1;

Fig. 4 is a sectional plan view on line 4—4 of Fig. 1; and

Fig. 5 is a diagrammatic plan view showing the relation of the machine to a wind-break being trimmed; and Fig. 6 is a sectional elevation of a modified form of the invention.

The tree trimming machine of this invention comprises generally a carriage 11 having a superstructure 12 upon which there is pivotally mounted a boom 13 adapted to carry a circular saw 14 which is driven by a motor 15 mounted on the carriage. The carriage is adapted to ride on a portable track 16 which may be of any suitable construction.

More particularly describing the invention, the carriage 11 is comprised of the side members 18—18' and end members 19—19'. Suitable cross braces 20 and 21 are provided at the center of the carriage. An intermediate cross member 22 is also provided. Extending parallel to the side members are motor support members 23 and 23'. The above mentioned members may be secured together in any well known manner such as by bolts or the like. Mounted under side members 18—18' are bearing blocks 24 to accommodate axles 25 and 26 upon which are mounted flanged wheels 27.

The track 16 has been shown as comprising the longitudinal track members 29 faced with metal strips 30. The members 29 rest on ties 31. Any suitable portable track might be used, however, the purposes of the track being to provide an approximately level runway for the machine. In laying the track attention should be given to making it level so that the boom will swing in a vertical plane. It is also contemplated that the boom and superstructure might be mounted on a vehicle not designed to operate on a track, such as a tractor or the like and that any known manual or automatic leveling means might be used for keeping the boom in a vertical plane.

At the rear of the carriage is mounted a seat 33 which may be used by an operator in handling the machine. Directly in front of the seat and therebelow mounted on a bracket 34 is a sprocket wheel 35 provided with cranks 36 adapted to be operated by a person on the seat 33. A second sprocket wheel 37 is provided and keyed to shaft 26 for driving the rear wheels 27 which are also keyed to the shaft. A chain 38 connects the two sprocket wheels.

Mounted on the carriage is a superstructure 12 which comprises the vertical side posts 40—40' which are adapted to support a horizontal shaft 41 near their upper ends. As additional support for the shaft, a third post, indicated by reference numeral 43 is provided spaced inwardly from side post 40. Side braces 44 and 45 are provided for each of posts 40—40'. A diagonal brace 46 is provided for the post 43, the brace 46 being attached at its lower end to a block 47 which is spaced inwardly from post 40' an amount substantially equal to the inward spacing of post 43 from post 40.

The boom 13 is pivotally mounted on the shaft by bearings 49—50. It is to be pointed out that bearing 50 is approximately intermediate posts 40 and 43 and that bearing 49 is approximately intermediate post 40' and a vertical plane passing through block 47.

The boom 13 is pivoted off center and comprises a long end 51 which is formed of a plurality of light weight tubular members welded or otherwise secured together. These tubular members comprise the longitudinally extending members 52—53—54, a fourth longitudinally extending member similar to member 53 but on the other side of the boom and hidden from view in the drawing, the cross braces 56 and diagonal braces 57. The long end of the boom is shaped so as to provide a side 58 which is straight along the entire length of the boom. The other side 59 of the boom and the bottom 60 of the boom are brought inwardly and upwardly respectively to terminate in a reduced end portion 61 upon which is mounted bearing blocks 62 and 63 for supporting shaft 64. Mounted on the shaft for rotation therewith is the circular saw 14 and a pulley 65.

The rear end or short end of the boom generally indicated by reference number 68 comprises the two side angle iron members 70—71 which are bent back upon themselves as indicated in the drawing. Each of the angle iron members is provided with a cross brace 73 which may be riveted or otherwise secured. Intermediate the cross members is mounted the bearing means 49—50 heretofore referred to. The long end of the boom 51 is secured to the ends of the angle irons by welding or any other suitable means to form the composite boom structure. At the rear end of the angle iron members 70—71 are provided counter weights 74. With this construction the boom is balanced and may easily be swung in a vertical plane. A removable cross brace 75 is provided connecting the divided rear portion of the boom. There is also provided a handle 76 to aid the operator in swinging the boom. With this construction it is apparent that a bifurcated short end is provided on the boom, this short end being free to pass between the posts supporting the shaft 41 and being designed to straddle the motor 15 (when brace 75 is removed). In this connection it should be pointed out that the motor 15 is mounted on the carriage so as to be between the vertical planes of swing of the parts forming the bifurcated end of the boom.

The motor is provided with a pulley 77. On the shaft 41 there is rotatably mounted a double pulley 78 which is adapted to accommodate a belt 79 extending from pulley 77 and also to accommodate a belt 80 extending from it to the pulley 65 on shaft 64. With this belt means for driving the circular saw it is apparent that the length of the belts is not changed by pivotal movement of the boom for the reason that the pulley 78 is rotatably mounted about the pivotal axis of the boom.

Ordinarily the machine is used with the boom in a forward position as indicated in Fig. 1 and in full lines in Fig. 5. However, it is sometimes necessary to swing the boom to the position shown in the broken lines in Fig. 5 in order to cut in back of the machine where it has been impracticable to lay sufficient track for the machine to cut ahead of it in the usual manner. When it is desired to swing the boom to the position shown in the broken lines in Fig. 5 cross brace 75 must necessarily be removed. However, it is seldom necessary to cut behind the machine.

In cutting trees or foliage having relatively small branches it has been found advantageous to reciprocate the boom back and forth on an arc and to accomplish this with the least possible effort on the part of the operator springs may be provided connecting the boom and the carriage. The springs are shown in Fig. 1 and are generally indicated by reference numerals 82 and 83. The springs are connected by lateral spring 84 in order to take up the slack. It is also desirable to have the springs removably secured by any suitable means so that the springs may be removed in the event it becomes desirable to swing the boom to the reverse position shown by the broken lines in Fig. 5.

In Fig. 6 a modified form of the invention has been shown wherein the boom 13 is pivotally mounted on the shaft 41a at a point outside the carriage and superstructure thereby permitting the end of the boom to swing clear of the carriage as indicated. In Fig. 6 only the carriage and superstructure and the portion of the boom have been shown for the reason that the motor may be located at any desirable point between the sides of the carriage.

In this form of the invention the shaft 41a is supported by means of post 86 and 87, cross brace 88 and the rod braces 89 and 89', diagonal braces 90 and 91 are provided for the posts.

With this form of the invention it is possible to make the bifurcated short end of the boom somewhat longer than in the other form of the invention as the short end may swing below the frame of the carriage.

Although the invention has been particularly shown and described it is contemplated that certain changes may be made and it is intended to cover such changes as may come under the scope of the claims.

We claim as our invention:

1. In a tree trimming machine, a carriage; a boom pivotally mounted on said carriage to swing in a vertical plane, said boom being mounted off-center and having a long end and a short end, said short end being bifurcated and weighted to counterbalance the long end; a circular saw mounted on the long end of said boom; a motor on said carriage; and means connecting said motor and said saw for driving said saw; said motor and said means connecting said motor and saw being positioned between the vertical planes of swing of the two parts forming the bifurcated end of the boom thereby permitting the bifurcated end of the boom to swing past said motor and said means connecting said motor and said saw.

2. In a tree trimming machine, a carriage; a superstructure on said carriage; a horizontally disposed shaft supported on said superstructure at spaced points; a composite boom having a long end and a short end pivotally mounted at two spaced points on said shaft, the short end of said boom being bifurcated and being provided with weight means for counterbalancing said long end, said short end of said boom being of less length than the distance between said shaft and said carriage thereby permitting said short end of said boom to swing past said carriage; a circular saw mounted on the long end of said boom; a motor on said carriage; and means connecting said motor and said saw for driving said saw; said motor and said means connecting said motor and saw being positioned between the vertical plane of swing of the two parts forming the bifurcated end of the boom thereby permitting the bifurcated end of the boom to swing past said motor and said means connecting said motor and said saw.

3. In a tree trimming machine, a carriage; a boom pivotally mounted on said carriage to freely swing in a vertical plane, said boom being pivotally supported off center on said carriage providing a long end and a short end, said short end being constructed and positioned to swing clear of said carriage when said boom is swung to opposite sides of a vertical position; weight means on the short end to counterbalance said long end; a circular saw mounted on said long end; means for driving said saw including a motor operatively connected to said saw; and spring means between said boom and said carriage, said spring means including spring elements yieldably urging said boom in opposite directions from a given position whereby said boom tends to oscillate if initially moved out of said given position.

4. In a tree trimming machine, a carriage; a superstructure on said carriage; a horizontal shaft mounted on said superstructure and extending transversely of said carriage beyond the sides of said carriage and superstructure; a boom pivotally mounted off center on said shaft beyond the lateral limits of said carriage and superstructure, said boom being bifurcated in the region of said shaft and having a bifurcated short end freely swingable past said carriage and said superstructure; a circular saw mounted at the outer end of the long end of said boom; weight means on said short end for counterbalancing said long end; a motor on said carriage; and means connecting said motor and said saw for driving said saw.

JOHN M. DICKENSON, Jr.
RALPH E. DICKENSON.